(12) United States Patent
Brooks (10) Patent No.: US 9,656,639 B1
(45) Date of Patent: May 23, 2017

(54) SYSTEM AND METHOD FOR INDUCING A SKID IN A VEHICLE

(71) Applicant: The United States of America, as represented by the Secretary of Homeland Security, Washington, DC (US)

(72) Inventor: Ernie Brooks, Glynco, GA (US)

(73) Assignee: The United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 15/281,703

(22) Filed: Sep. 30, 2016

(51) Int. Cl.
| | | |
|---|---|---|
| *G01M 17/00* | (2006.01) | |
| *B60T 7/18* | (2006.01) | |
| *G05D 1/00* | (2006.01) | |
| *B60T 8/176* | (2006.01) | |
| *B60T 8/32* | (2006.01) | |

(52) U.S. Cl.
CPC .............. *B60T 7/18* (2013.01); *B60T 8/176* (2013.01); *G05D 1/0016* (2013.01); *B60T 2270/10* (2013.01)

(58) Field of Classification Search
CPC ................................. G01M 17/00; B60T 8/32
USPC ........................................ 701/2, 71, 82, 83
See application file for complete search history.

(56) References Cited

U.S. PATENT DOCUMENTS

| | | | | |
|---|---|---|---|---|
| 2010/0152989 | A1* | 6/2010 | Smith | ........................ B60T 7/20 701/78 |
| 2015/0370256 | A1* | 12/2015 | Erhart | .................... A63H 30/04 701/2 |

OTHER PUBLICATIONS

Bobby C. Freeman, "Sneaky Brake Aids Driver Training", Law and Order Magazine, Sep. 1993.

* cited by examiner

*Primary Examiner* — Tan Q Nguyen
(74) *Attorney, Agent, or Firm* — Lavanya Ratnam; Trenton Roche; Nathan Grebasch (57) ABSTRACT

Aspects of the disclosure provide a system and methods for inducing a skid in a vehicle. The system includes a mobile controller corresponding to a vehicle and communicatively coupled to a brake system of the vehicle, and a remote controller in wireless communication with the mobile controller. The remote controller is configured to receive a selection of the mobile controller for issuance of a braking command including a braking setting. In response to receipt of the braking command, the selected mobile controller is configured to operate the brake system of the vehicle to induce a skid in the vehicle according to the braking setting.

19 Claims, 6 Drawing Sheets

SYSTEM AND METHOD FOR INDUCING A SKID IN A VEHICLE

BACKGROUND

Road conditions and driving behaviors, such as wet or icy roads, sudden braking, excessive speed while entering a curve, and the like, can cause vehicles to skid or drift, which account for many accidents and automobile related deaths. Training vehicles simulating the skidding conditions make it possible for drivers to have real experience of a skidding situation. The real experience helps the drivers to understand the dynamics of a skidding situation, and improve their skills to handle such a situation.

SUMMARY

Aspects of the disclosure provide a system for inducing a skid in a vehicle. The system includes a mobile controller corresponding to a vehicle and communicatively coupled to a brake system of the vehicle, and a remote controller in wireless communication with the mobile controller. The remote controller is configured to receive a selection of the mobile controller for issuance of a braking command including a braking setting. In response to receipt of the braking command, the selected mobile controller is configured to operate the brake system of the vehicle to induce a skid in the vehicle according to the braking setting.

In an embodiment, the braking setting is configurable by the remote controller. In an embodiment, the braking setting specifies a wheel of the vehicle for braking, at least one time period for braking the wheel, and braking pressure levels corresponding to the at least one time period. Accordingly, the selected mobile controller operates the brake system of the vehicle to brake the wheel specified in the braking command during the at least one time period specified in the braking command with the braking pressure level specified in the braking command.

In an example, the mobile controller includes a receiver configured to receive a wireless signal carrying the braking command from the mobile controller, and a controller circuitry configured to receive the braking command from the receiver, and to generate a braking control signal for operating the brake system of the vehicle based on the braking command.

In another example, the remote controller includes an input device configured to receive input information, a display device configured to display a user interface, a transmitter configured to transmit the wireless signal carrying the braking command, controller circuitry configured to allow configuration of the braking setting and issuance of the braking command, and memory configured to store the braking command.

In an embodiment, the mobile controller further includes a transceiver configured to transmit information of the braking control signal to an electrical control unit (ECU) of the brake system of the vehicle.

In another embodiment, the mobile controller further includes a drive voltage generator that generates a drive voltage to drive a hydraulic control unit (HCU) of the brake system of the vehicle. In a further example, the mobile controller is configured to generate a brake motor control signal to actuate a wheel brake motor of the brake system of the vehicle.

Aspects of the disclosure provide a method for inducing a skid in a vehicle. The method includes receiving a braking command including a braking setting at a mobile controller issued by an instructor remote controller, and operating a brake system of a vehicle associated with the selected mobile controller to induce a skid in the vehicle according to the braking setting.

Aspects of the disclosure provide a method for inducing a skid in a vehicle. The method including configuring a braking setting for a vehicle from among a plurality of available vehicles, selecting a mobile controller from among a plurality of mobile controllers each associated with one vehicle from among the plurality of available vehicles, and issuing a braking command including the braking setting to the vehicle associated with the selected mobile controller.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
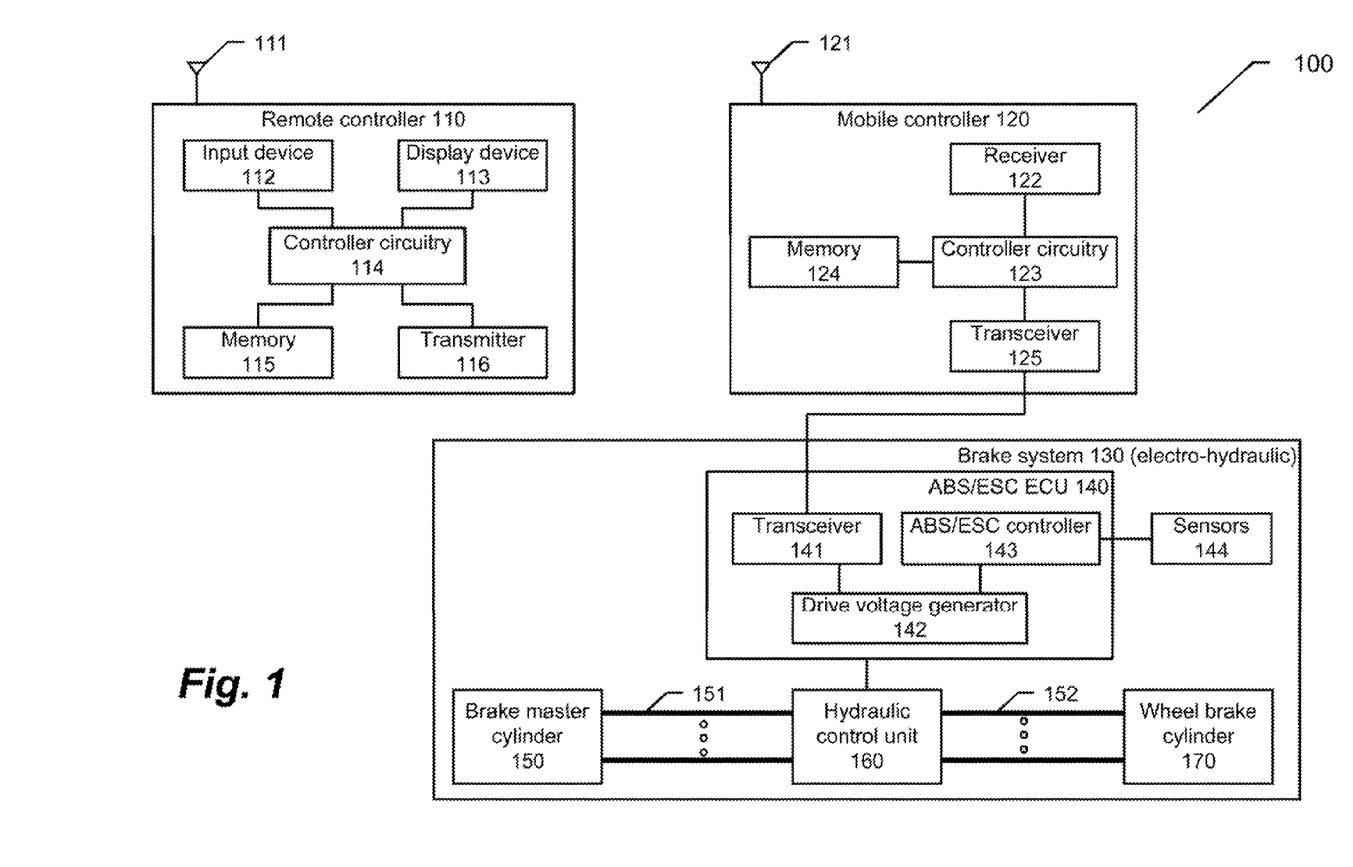
FIG. 1 shows a first system for inducing a skid in a vehicle according to an embodiment of the disclosure.

FIG. 1 shows a system 100 for inducing a skid in a vehicle according to an embodiment of the disclosure. The system 100 includes a remote controller 110 and multiple mobile controllers 120 in wireless communication with the remote controller 110 (only one mobile controller 120 is shown). Each mobile controller 120 may be communicatively coupled to a brake system 130 of a vehicle. Furthermore, mobile controller 120 may be contained within an interior surface of the vehicle, may be located on an outside surface of the vehicle, or may be located proximate to the vehicle.

In an example, the system 100 is used to create a skidding situation in a vehicle for purposes of training a driver of the vehicle to handle the skidding situation. Specifically, an instructor of a training program can use the remote controller 110 to select one of the mobile controllers 120 to issue a braking command. Alternatively, the instructor can select a particular vehicle using remote controller 110 for issuance of a braking command, and the selection of the particular vehicle can result in the automatic selection of a mobile controller associated with the selected vehicle. In response to receiving the braking command, the selected mobile controller 120 operates the brake system 130 of the vehicle associated with the selected mobile controller 120 to induce a skid in the vehicle. For example, mobile controller 120 may control the brake system 130 to lock one or more wheels of the vehicle, causing the vehicle to skid. A driver of the vehicle experiences the skidding situation, which results in the driver learning how to appropriately handle such a skidding situation.

In an embodiment, the remote controller 110 allows an instructor to preconfigure a braking command. Specifically, a braking command can include a braking setting, and different braking settings can be preconfigured for different mobile controllers and/or vehicles. Such braking settings may be stored at the remote controller 110. When a braking command is issued to a selected mobile controller 120, a braking setting preconfigured to be used with the selected mobile controller 120 can be included in the braking command and transmitted to the selected mobile controller 120.

A braking setting may specify one or more wheels of the vehicle for inducing a skid, one or more sequences of time periods for braking operations each corresponding to one of the specified wheels, and braking pressure levels each corresponding to one of the time periods. Each time period has a start time with respect to the brake operation corresponding to the braking command, and a length of time for braking the corresponding wheel. Alternatively, the time period may be specified using a defined start time and a defined end time. For example, a braking setting for a vehicle can specify a first wheel and a second wheel of the vehicle for inducing a skid. In addition, the braking setting can specify a first sequence of time periods for braking the first wheel, and multiple braking pressure levels each corresponding to one of the time periods. The first sequence of time periods, for example, can include a first time period starting from the beginning of the corresponding braking operation caused by the braking command, lasting for two seconds, and having a first braking pressure level, and a second time period starting from the fifth second of the corresponding braking operation, lasting for five seconds, and having a second braking pressure level. Similarly, the braking setting can specify a second sequence of time periods and multiple braking pressure levels for braking the second wheel.

Accordingly, each braking setting can cause different skidding patterns corresponding to different skidding dynamics. For example, a first braking setting may specify two front wheels of a vehicle, two time periods corresponding to the two front wheels (e.g., brake for five seconds from a defined start time of the braking operation), and braking pressure levels for the two front wheels during the two time periods that result in the two front wheels being locked. Consequently, when such a braking setting is included in a braking command and transmitted to the vehicle, a mobile controller 120 associated with the vehicle operates a brake system 130 of the vehicle to brake the front wheels of the vehicle, causing the front wheels to be locked and the vehicle to slide. Thus, a skid of understeer skidding pattern can occur where the vehicle steers less than an amount desired by a driver of the vehicle. In another example, a second braking setting specifies two rear wheels of a vehicle, two time periods defining braking of the two rear wheels for five seconds from a defined start time of the braking operation, and braking pressure levels for the two rear wheels. Consequently, when such a braking setting is included in a braking command and transmitted to the vehicle, a mobile controller 120 associated with the vehicle brakes the two rear wheels of the vehicle, causing the vehicle to slide. Thus, a skid of oversteer skidding pattern can take place where the vehicle steers more than an amount desired by a driver of the vehicle.

The remote controller 110 allows an instructor to select a mobile controller 120 or a vehicle carrying the mobile controller 120 to wirelessly issue a braking command to the mobile controller 120. For example, the remote controller 110 allows an instructor to wirelessly control multiple mobile controllers 120 each associated with a vehicle during a training program. The instructor can first operate the remote controller 110 to preconfigure multiple braking settings each corresponding to a vehicle used in the training process. Preconfigured braking settings can be stored in a memory in the remote controller 110. Subsequently, the instructor can select a mobile controller 120 and/or a vehicle associated with the mobile controller 120, for example, by clicking a button representing the to-be-selected mobile controller 120 and/or vehicle on a keypad of the remote controller 110, or by touching an icon indicating the to-be-selected mobile controller 120 and/or vehicle on a touch panel of the remote controller 110, causing the remote controller 110 to transmit a wireless signal. The wireless signal carries information of the braking command including the corresponding braking setting.

In one embodiment, the remote controller 110 allows one instructor to simultaneously control multiple mobile controllers 120 and select mobile controllers and/or vehicles in arbitrary order to induce a skid. Remote controller 110 may be configured to control all mobile controllers within wireless range, or in certain embodiments, may filter a subset group of mobile controllers that can be used based on one or more evaluation criteria associated with an operating environment. For example, certain mobile controllers may be uncontrollable due to a variety of factors, such a physical or physiological capabilities of an instructor, vehicle conditions and capabilities, test range conditions, such as weather or geographical conditions, wireless communication constraints, or other such physical or operational constraints. For example, in one embodiment, remote controller 110 may be restricted from selecting a particular mobile controller associated with a vehicle that is beyond a pre-defined wireless transmission range or where a wireless signal strength is below a predefined threshold, out of safety concerns that the mobile controller may receive corrupted braking commands, which could lead to erratic braking and safety issues for the driver. In another embodiment, remote controller 110 may be restricted from selecting mobile controllers if the temperature is below a preset threshold value, unless the mobile controllers are associated with a vehicle possessing four-wheel drive capability.

In another embodiment, a braking command may include an identification (ID) indicating a selected mobile controller or vehicle in addition to a braking setting. In the embodiment, the multiple mobile controllers 120 can operate on a same frequency. When the remote controller 110 transmits a signal using such a frequency, each mobile controller 120 uses the ID included in the braking command to determine if the command is targeted to itself. In other embodiments, different mobile controller can operate on different frequencies, and therefore, inclusion of an ID in the braking command may not be included.

In another embodiment, a braking command includes a sequence of braking settings. For example, the sequence of braking settings includes a first braking setting corresponding to a first skidding pattern, e.g., an oversteer pattern, and a second braking setting corresponding to a second skidding pattern, e.g., an understeer pattern. In such a way, various skidding patterns can be created for a driver training course.

In an embodiment, the remote controller 110 allows an instructor to select a vehicle and a corresponding mobile controller 120 to wirelessly issue a stop command to stop a braking operation. For example, the instructor can control a remote controller 110 to select and click a button associated with the vehicle on a touch panel or a keypad to issue the stop command. The stop command can include an II) indicating the selected mobile controller or vehicle and information representing a stop-braking operation. This function of the remote controller 110 issuing a stop command can be used when emergency situation occurs requiring an immediate termination of a braking of a vehicle.

The remote controller 110 can include an input device 112, a display device 113, a controller circuitry 114, a memory 115, a transmitter 116 and an antenna 111 in an embodiment. The input device 112 can be a keyboard, a keypad, a touch panel, and the like. The input device 112 receives input information from an instructor and allows the instructor to preconfigure braking commands for vehicles each containing a mobile controller 120. In addition, the input device 112 allows the instructor to select one of the vehicles, and issue a command, such as a braking command, to the selected vehicle, for example, by clicking a button of the input device 112. The display device 113 can be an LCD, or other types of display devices in various embodiments. In an example, the display device 113 displays an interface to allow an instructor to preconfigure a braking command or issue a braking command.

In an example, the controller circuitry 114 generates the interface displayed at the display device 113. In addition, the controller circuitry 114 receives input information from the input device 112, and accordingly performs various functions, such as storing a preconfigured braking setting in the memory 115, and, when an instructor issues a command, generating a signal carrying information of the command and transmitting the signal to the transmitter 116. In one embodiment, the controller circuitry 114 is implemented using hardware, such as application specific interested circuits (ASICs), field programmable gate arrays (FPGA), and the like. In another embodiment, the controller circuitry 114 is implemented using a general purpose processor executing software program instructions.

In an example, the memory 115 can include a volatile memory, such as a random accessible memory (RAM), or a non-volatile memory, such as a flash memory. The memory 115 stores the preconfigured braking settings each associated with a vehicle carrying a mobile controller 120. In addition, the memory 115 may store software program instructions executed by the controller circuitry 114, including instructions for causing the controller circuitry 114 to perform steps consistent with embodiments disclosed herein.

In an example, the transmitter 116 receives a signal from the controller circuitry 114 carrying information of a braking command or a stop command, and transmits a wireless signal carrying the information of the braking command or the stop command via the antenna 111. The transmitter 116 can include suitable components to perform its functions, such as an encoder, a digital to analog converter, a modulator, and an amplifier for processing to-be-transmitted signals.

In an example, the remote controller 110 controlled by an instructor transmits wireless signals directly to the mobile controllers 120. In another example, the remote controller 110 controlled by an instructor transmits wireless signals to a wireless communication network, such as a Wi-Fi network or wireless cellular communication network, which then transmits a wireless signal to the mobile controllers 120. Accordingly, the transmitter 116 includes circuits enabling the transmitter 116 to operate with various communication protocols associated with the wireless communication network.

The mobile controller 120 is associated with a vehicle. The vehicle can be a car, a truck, a sport utility vehicle (SUV), a van, and the like. The mobile controller 120 can receive a braking command from the remote controller 110, and generate one or more braking control signals to operate the brake system 130 of the vehicle. In an embodiment, the mobile controller 120 includes an antenna 121, a receiver 122, a controller circuitry 123, a memory 124, and a transceiver 125.

In an example, the receiver 122 receives a wireless signal from the transceiver 116 of the remote controller 110 using the antenna 121, and the wireless signal carries information of a braking command or a stop command. Subsequently, the receiver 122 transmits information of the braking command or the stop command to the controller circuitry 123. The receiver 122 can include suitable components to perform its functions, such as an amplifier, a demodulator, an analog to digital converter, and a decoder for processing received signals. In an example, the receiver 122 can receive wireless signals directly transmitted from the mobile controllers 120. In another example, the receiver 122 can receive wireless signals from the remote controller 110 through a wireless communication network, such as a Wi-Fi network or wireless cellular communication network. Accordingly, the receiver 122 can include circuits for operating with various communication protocols associated with the wireless communication network.

The controller circuitry 123 generates a braking control signal for operating the brake system 130 according to a braking command received from the receiver 122. For example, the controller circuitry 123 can first check the ID included in the braking command to determine if the braking command is issued to the vehicle containing the controller circuitry 123. Then, if the braking command is issued to the vehicle containing the controller circuitry 123, or in other words, the vehicle containing the controller circuitry 123 is the selected vehicle for performing a braking operation, the controller circuitry 123 checks the braking setting in the braking command, and generates a braking control signal based on the braking setting. In an example, the braking setting specifies multiple wheels of the selected vehicle and multiple sequences of time periods each corresponding to one of the specified wheels. Accordingly, the braking control signal includes information included in the braking setting. Subsequently, the controller circuitry 113 transmits the braking control signal to the transceiver 125.

In another example, the controller circuitry 123 receives a stop command from the receiver 122. Accordingly, the controller circuitry 123 generates a braking control signal including information of the stop command, and transmits the braking control signal to the transceiver 125. In various embodiments, the controller circuitry 123 can be implemented using hardware, e.g., ASIC, FPGA, and the like, or software executed by a general purpose processor.

The memory 124 can include a volatile memory, such as a RAM, or a non-volatile memory, such as a flash memory, and store software programs executed by a general purpose processor to perform related functions of the controller circuitry 123, including instructions for causing the controller circuitry 123 to perform steps consistent with embodiments disclosed herein. The memory 124 can also store other software programs for performing functions of other elements in the mobile controller 120.

The transceiver 125 provides a communication channel between the mobile controller 120 and the brake system 130. The transceiver 125 receives a braking control signal from the controller circuitry 123 and transmits information of a braking setting included in the braking control signal to the brake system 130. In an example, the transceiver 125 is implemented as a controller area network (CAN) interface. Controller area network (CAN) is a serial bus system and standard for connecting microcontrollers and devices in an in-vehicle network. CAN provides a message-based protocol that can be used for multiplex electrical wiring within automobiles and in other contexts. In another example, the transceiver 125 is implemented as a FlexRay interface. FlexRay is another standard developed by the FlexRay Consortium for on-board automotive computing. In a further example, the transceiver 125 provides a wireless communication channel between the mobile controller 120 and the brake system 130 using Wi-Fi technology.

The brake system 130 receives information of a braking setting, and performs a braking operation according to the braking setting to induce a skid in the vehicle containing the mobile controller 120 and the brake system 130. In an example, the brake system 130 is an electro-hydraulic brake system as shown in FIG. 1. As shown, the brake system 130 includes a brake master cylinder 150, a hydraulic control unit (HCU) 160, one or multiple wheel brake cylinders each associated with a wheel in the vehicle, an anti-lock brake system (ABS)/electronic stability control (ESC) electronic control unit (ECU) 140, and a plurality of sensors 144.

The brake master cylinder 150 is connected with the HCU through one or more brake lines 151 filled with a liquid, such as brake oil. In an example, the brake master cylinder 150 receives a pressure caused by a brake pedal and pressurizes the liquid to generate hydraulic pressure in the liquid. The HCU 160 is installed between the brake master cylinder 150 and the wheel brake cylinders 170, and is connected with each wheel brake cylinder 170 through a brake line 152 filled with the liquid. The HCU 160, under the control of the ABS/ESC ECU, regulates or modulates the hydraulic pressure in the brake lines 152 to adjust brake pressures imposed on each wheel. Each of the wheel brake cylinders 170 is associated with a wheel brake assembly, and can receive a modulated hydraulic pressure from the HCU 160, causing the wheel brake assembly to impose a brake pressure to the corresponding wheel accordingly.

The ABS/ESC ECU 140 generates drive voltages to control the HCU 160 based on braking control signals received from the mobile controller 120, or sensor signals from the sensors 144. The sensors 144 can include wheel speed sensors, a steering angel sensor, a yaw rate sensor, acceleration sensors, and the like.

The brake system 130 can operate in different operation mode according to different conditions. For example, the brake system 130 can operate in a normal braking mode. In a normal braking mode, the hydraulic pressure is applied to the wheel brake cylinders 170 from the brake master cylinder 150 without HCU performing modulation to the hydraulic pressure. When the sensors 144 detect a lock-up tendency at a wheel during a braking operation, for example, caused by a driver overly pressing the brake pedal, the ABS/ESC ECU may be triggered to perform ABS operation, and the brake system 130 starts to operate in an ABS mode. Specifically, under the control of the ABS/ECS ECU, the HCU 160 reduces a braking pressure imposed on the wheel having the lock up tendency to prevent the wheel from being locked. In another example, when a skidding is detected in the vehicle by the sensors 144, the brake system 130 may start to operate in an ECS mode. Specifically, controlled by the ABS/ESC EDU, the HCU may generate hydraulic pressure, for example, by actuating a pump in the HCU, and impose the hydraulic pressure to brake a wheel to prevent or counter act the skidding.

In a further example, the brake system 130 can operate in a skid-inducing mode according to an aspect of the disclosure. Specifically, when a braking control signal carrying information of a braking setting is received at the brake system 130, the brake system 130 may start to operate in the skid-inducing mode. In the skid-inducing mode, ABS and ESC functions may be deactivated, and under the control of the ABS/ESC ECU 140, the HCU 160 can impose hydraulic pressures to wheels specified in the braking setting according to sequences of time periods and braking pressure levels specified in the braking setting to induce a skid in the vehicle.

In an example, the ABS/ECS ECU 140 includes a transceiver 141, a drive voltage generator 142, and an ABS/ESC controller 143. The transceiver 141 has functions and structures similar to the transceiver 125, and provides a communication channel between the mobile controller 120 and the brake system 130. The transceiver 141 receives signals carrying information of braking control signals from the transceiver 125 and transmits the braking control signals to the drive voltage generator 142.

The ABS/ESC controller 143 receives sensor signals from the sensors 144 and continuously makes decisions for braking operations based on the received sensor signals using certain ABS and ESC algorithms. Based on the decisions, the ABS/ESC controller 143 generates ABS/ESC control signals and transmits the ABS/ESC control signals to the drive voltage generator 142.

The drive voltage generator 142 generates drive voltages based on the braking control signals received from the transceiver 141 or the ABS/ECS control signals received from the ABS/ESC controller 143. The drive voltages are used to drive valves or pumps in the HCU 160 to regulate or modulate hydraulic pressures to corresponding wheels. For example, a braking control signal from the transceiver 141 can include information of a braking setting that specifies wheels for inducing a skid, sequences of time periods corresponding to each specified wheels, and braking pressure levels corresponding to each time period. Accordingly, the drive voltage generator 142 can generate drive voltages for driving valves and pumps in the HCU causing the HCU to impose hydraulic pressures to the specified wheels during time periods specified in the braking setting. In addition, the braking pressure levels imposed on the specified wheels during the specified time periods accord with that specified in the braking setting.

In an example, when a braking control signal is received from the transceiver 141, the drive voltage generator 142 is configured to ignore the ABS/ESC control signals received from the ABS/ESC controller 143 to avoid possible conflicts between the skid-inducing operation and the ABS/ESC functions.

Figure 2:
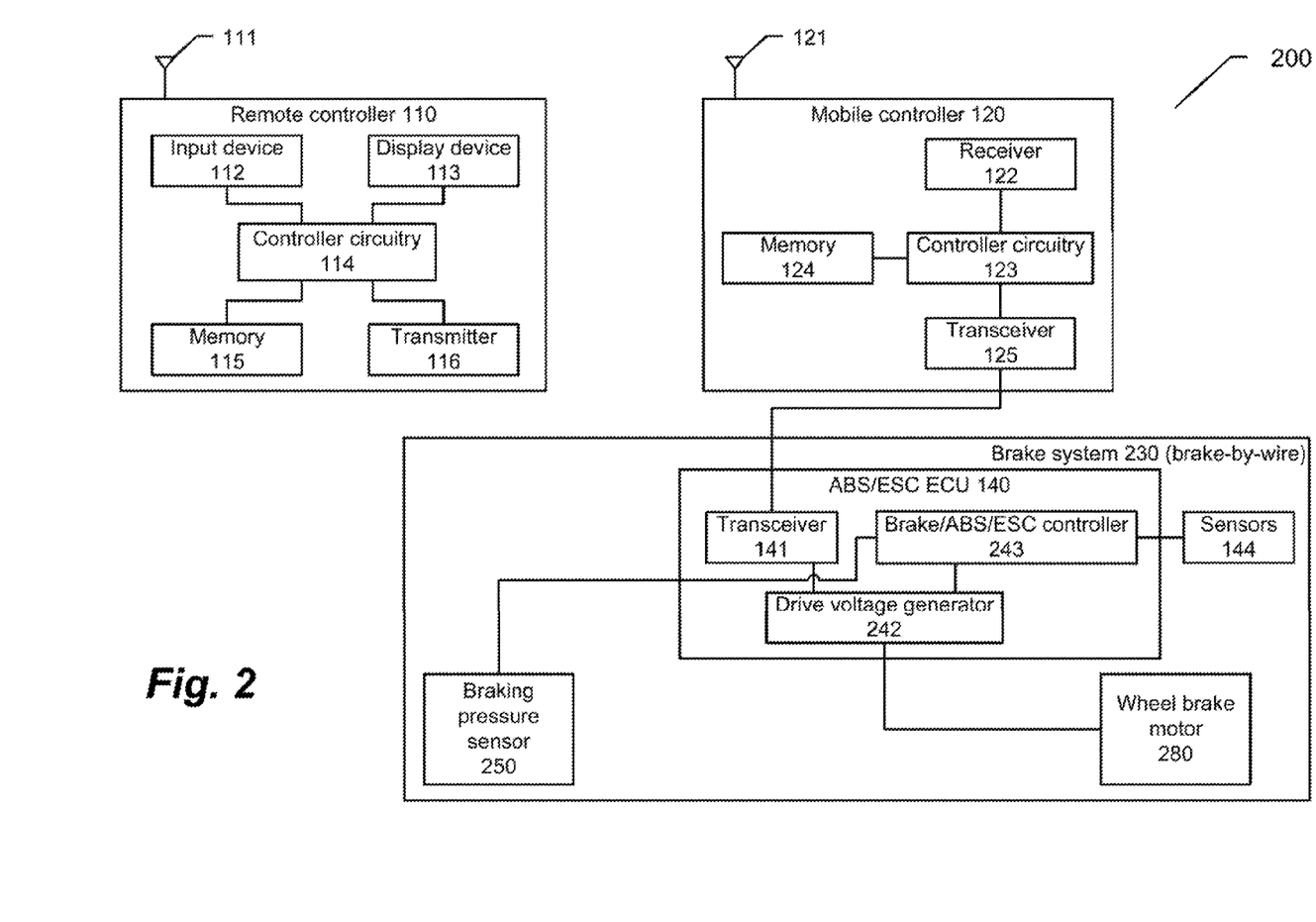
FIG. 2 shows a second system for inducing a skid in a vehicle according to an embodiment of the disclosure.

FIG. 2 shows a system 200 for inducing a skid in a vehicle according to an embodiment of the disclosure. The system 200 includes a remote controller 110 similar to the remote controller 110 in the FIG. 1 example, and one or more mobile controllers 120 each similar to the mobile controller 120 in the FIG. 1 example. Each mobile controller 120 wirelessly communicates with the remote controller in the system 200. Each mobile controller 120 is contained in a vehicle having a brake system 230, and is communicatively coupled to the brake system 230 of the corresponding vehicle.

The system 200 operates in a way similar to the system 100 in the FIG. 1 example to induce a skid in a vehicle. For example, a user of the remote controller 110 can control the based controller 110 to select one of the vehicles containing the one or more mobile controllers 120 to issue a braking command to the mobile controller 120 contained in the selected vehicle. The braking command can include a braking setting specifying wheels for inducing a skid, sequences of time periods and braking pressure levels corresponding to one of the time periods. As a response, the mobile controller 120 of the selected vehicle can operate the brake system 230 to induce a skid in the selected vehicle.

However, different from the brake system 130 that is an electro-hydraulic brake system, the brake system 230 is a brake-by-wire brake system that uses electronic signals instead of a hydraulic system to perform braking operations. In an example, the brake system 230 includes a braking pressure sensor 250, a brake/ABS/ESC ECU 240, a plurality of sensors 144, and one or more wheel brake motors 280. The braking pressure sensor 250 detects a strength of pressure imposed on a brake pedal, and transmits a sensor signal to the brake/ABS/ESC ECU 240. The sensors 144 include sensors similar to the sensors 144 in the FIG. 1 example, and transmit sensor signals to the brake/ABS/ESC ECU 240.

The brake/ABS/ESC ECU 240 generates brake motor control signals based on the sensor signals received from the braking pressure sensor 250 and the sensors 144, and the braking control signals received from the mobile controller 120. The brake motor control signals corresponds to different wheel brake motors 280, and are transmitted to different wheel brake motors 280 accordingly to impose a brake pressure to a corresponding wheel.

In an example, each of the wheel brake motors 280 can include a drive power supply circuit, and a motor, such as a permanent magnet DC motor. The drive power supply circuit receives power from a power supply of the vehicle, and, controlled by the brake motor control signals from the brake/ABS/ESC ECU 240, generates a drive voltage to drive the motor. The motor causes a brake assembly to impose a brake pressure to the corresponding wheel, and a pressure level of the brake pressure accords with braking pressure levels specified in a braking setting carried in the braking control signals from the mobile controller 120.

Similar to the system 100, the system 200 can operate in different operation modes, such as a normal braking mode, an ABS mode, an ESC mode, or a skid-inducing mode. When the brake system 230 is operating in the skid-inducing mode, the brake/ABS/ECS functions may be deactivated to avoid conflicts between the skid-inducing operation and other braking operations.

In an example, the brake/ABS/ESC ECU 243 includes a transceiver 141 similar to the transceiver 141 in the FIG. 1 example, a brake/ABS/ESC controller 240, and a drive voltage generator 242. The brake/ABS/ESC controller 243 has functions similar to the ABS/ESC controller 143 in FIG. 1, however, includes an additional function for generating a braking control signals based on the sensor signal from the braking pressure sensor 250. The drive voltage generator 242 generates brake motor control signals for actuating the wheel brake motors 20. Based on control signals received from the transceiver 141 and the brake/ABS/ESC ECU 243, brake motor control signals are generated to actuate the wheel brake motors 280 to perform different braking operations, such as skid-inducing operations, normal braking operations, ABS braking operations, ESC operations, and the like.

Figure 3:
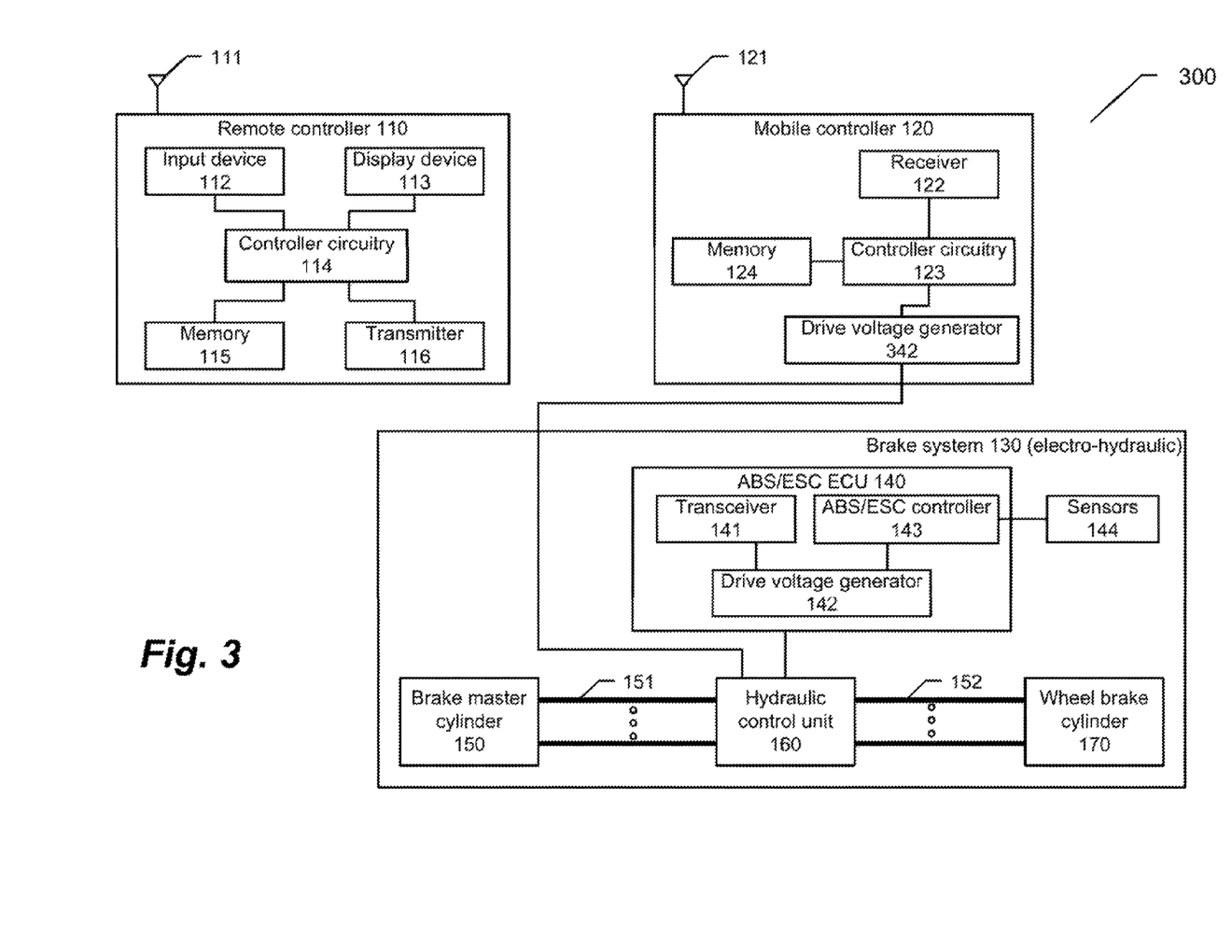
FIG. 3 shows a third system for inducing a skid in a vehicle according to an embodiment of the disclosure.

FIG. 3 shows a system 300 for inducing a skid in a vehicle according to an embodiment of the disclosure. The system 300 includes a remote controller 110, and one or more mobile controllers 320. Each mobile controller 320 is contained in a vehicle and is coupled with a brake system 130 of the vehicle. The remote controller 110, the mobile controller 320, and the brake system 130 are similar to the remote controller 110, the mobile controller 120, and the brake system 130 in the FIG. 1 example, respectively.

However, different from the FIG. 1 example, the mobile controller 320 includes a drive voltage generator 342 instead of the transceiver 125, and is coupled to the HCU 160 of the brake system 130 instead of the ABS/ECS ECU 140 of the brake system 130.

In an example, the drive voltage generator 342 includes drive voltage generating circuits for generating drive voltages suitable for driving valves and pumps in the HCU 160. The valves and pumps in the HCU 160 can be organized into multiple groups each corresponding to a wheel and an associated wheel brake cylinder. Each group, for example, can include multiple solenoid valves each having an open position and a closed position for regulating a hydraulic pressure for a corresponding wheel, a pump to introduce the hydraulic pressure, and a variable valve whose position can be varied to adjust the hydraulic pressure generated by the pump. Accordingly, the drive voltage generating circuits can have multiple output ports each connected to a valve or a pump. In addition, a switch, such as a solid state relay, can be installed between each ports and the corresponding valve or pump, and each switch can be controlled by a braking control signal generated at the controller circuitry 123.

In operation, according to a braking setting, the controller circuitry 123 generates multiple braking control signals to control multiple switches in the drive voltage generator 342. Consequently, drive voltages generated at the drive voltage generator 342 are imposed on the valves or pumps in the HCU 160 according to the braking setting. For example, a braking setting specifies a wheel, a sequence of time periods, and braking pressure levels corresponding to each time period for inducing a skid in the vehicle. Accordingly, drive voltages can be generated at the dive voltage generator 342 such that braking operations are performed on the specified wheel during the specified time periods with the specified braking pressure levels.

Figure 4:
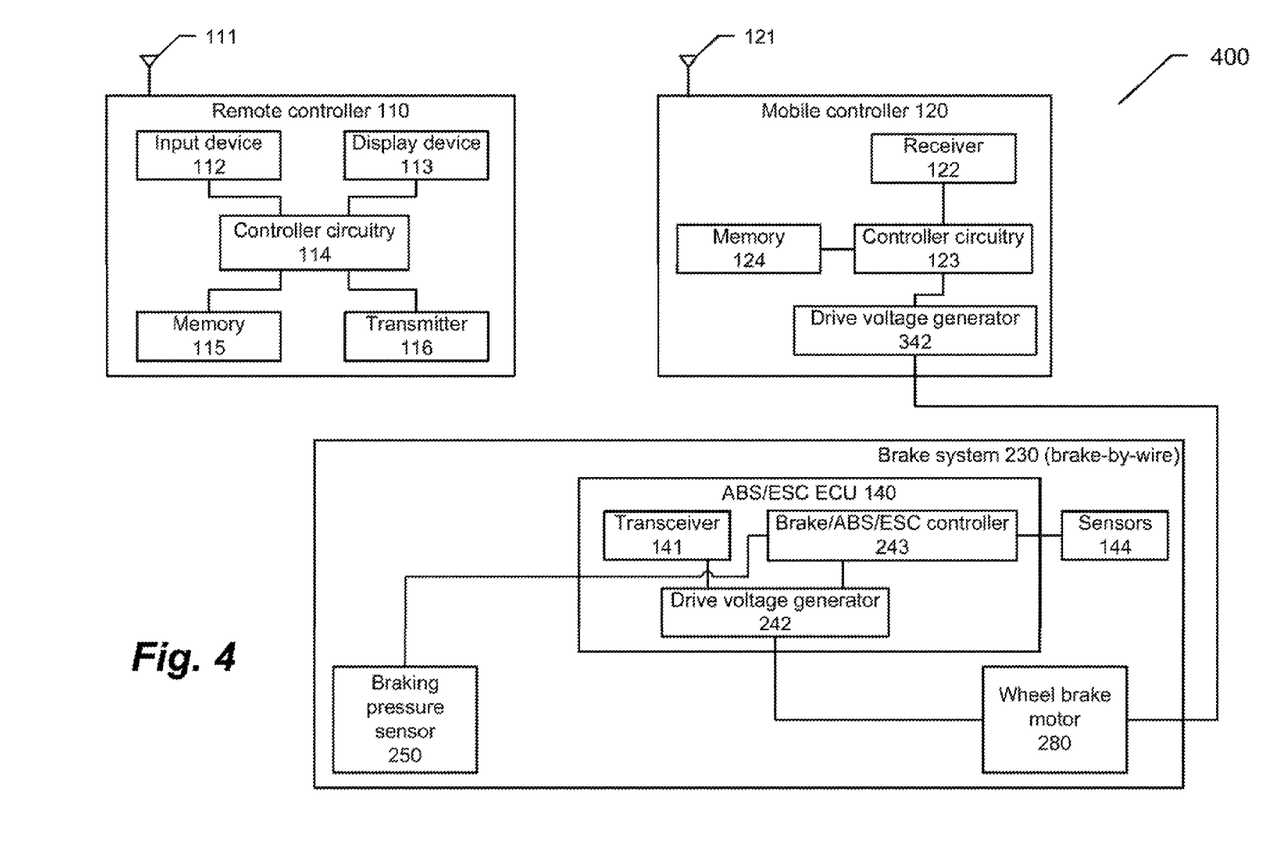
FIG. 4 shows a fourth system for inducing a skid in a vehicle according to an embodiment of the disclosure.

FIG. 4 shows a system 400 for inducing a skid in a vehicle according to an embodiment of the disclosure. The system 400 includes a remote controller 110, and one or more mobile controllers 320 each contained in a vehicle. Each mobile controller 320 is coupled to a brake system 230 of the vehicle. The remote controller 110 and the mobile controller 320 have structures and functions similar to the remote controller 110 and the mobile controller 320 in the FIG. 3 example, while the brake system 230 in the system 400 is similar to the brake system 230 in the FIG. 2 example. Accordingly, different from the system 300, the drive voltage generator 342 is coupled to the wheel brake motors 280, and generates brake motor control signals for actuating the wheel brake motors 280.

In operation, the controller circuitry 123 generates multiple braking control signals according to a braking setting. Under the control of the braking control signals, the drive voltage generator 342 generates brake motor control signals to actuate the wheel brake motors 280, causing a brake pressure to a corresponding wheel. Consequently, braking operations are performed according to the braking setting. For example, a braking setting specifies a wheel, a sequence of time periods, and braking pressure levels corresponding to each time period for inducing a skid in the vehicle. Accordingly, brake motor control signals can be generated at the drive voltage generator 342 such that braking operations are performed on the specified wheel during the specified time periods with the specified braking pressure levels.

Figure 5:
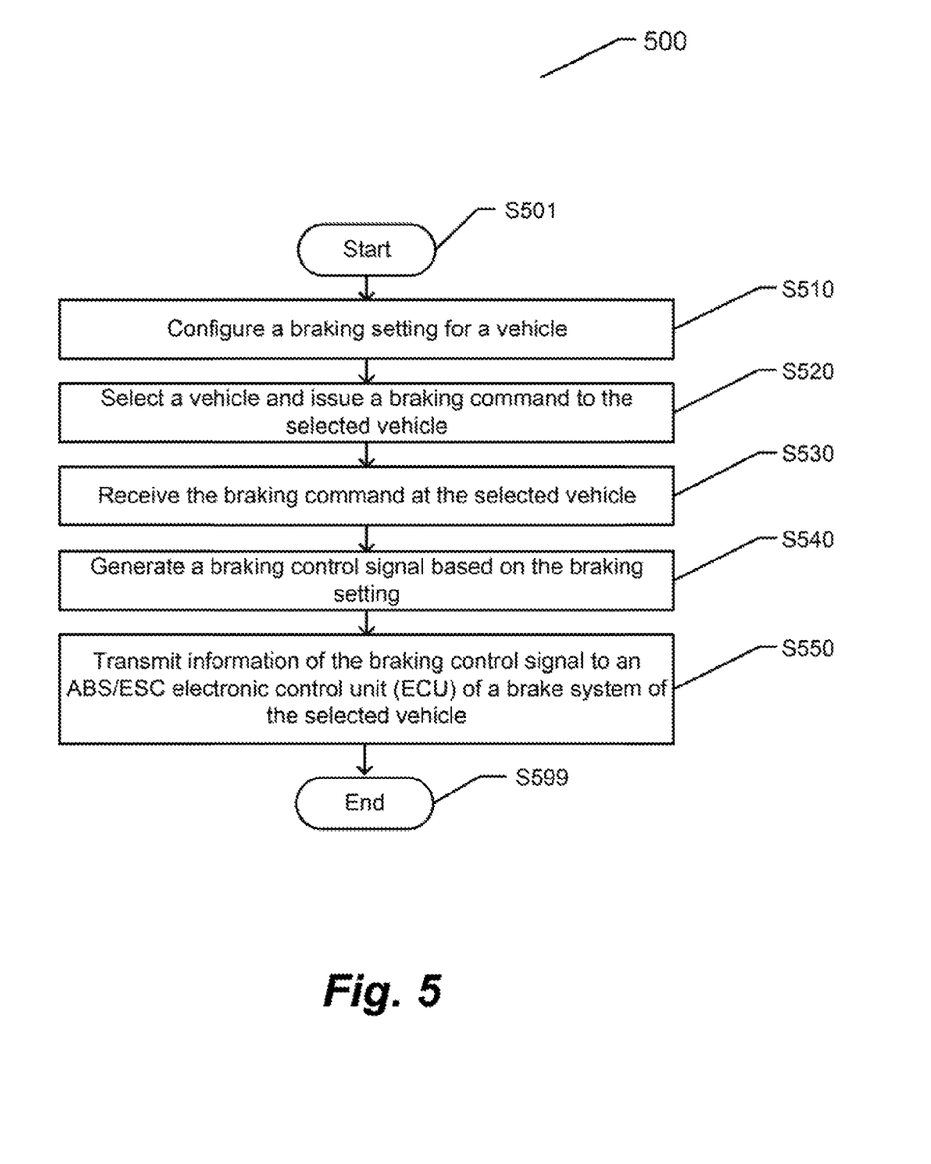
FIG. 5 shows a first process for inducing a skid in a vehicle according to an embodiment of the disclosure.

FIG. 5 shows a process 500 for inducing a skid in a vehicle according to an embodiment of the disclosure. The process 500 can be applied to examples where a mobile controller is coupled to an ABS/ESC ECU of a brake system. The process 500 starts at S501, and proceeds to S510.

At S510, a braking setting is configured for a vehicle. A system for inducing a skid in a vehicle can include a remote controller and multiple mobile controllers each contained in a vehicle. An instructor for a driver training program can use the remote controller to configure a braking setting for each vehicle, according to the embodiments discussed above. The brake setting configured can be stored in the remote controller.

At S520, a mobile controller and/or a vehicle is selected, and a braking command including a braking setting is issued to the selected mobile controller and vehicle. Specifically, a wireless signal carrying the braking command can be transmitted to the selected mobile controller of the selected vehicle.

At S530, the braking command is received at the selected mobile controller in the selected vehicle. In an example, a receiver in the mobile controller is used to receive the braking command.

At S540, a braking control signal is generated based on the braking setting. The braking control signal includes information of the braking setting.

At S550, information of the braking control signal is transmitted to an ABS/ESC ECU of a brake system of the selected vehicle corresponding to the selected mobile controller. In various examples, the brake system can be an electro-hydraulic brake system using a HCU to modulate hydraulic pressures for braking wheels, or a brake by-wire brake system where wheel brake motors controlled be the ECU are used.

Figure 6:
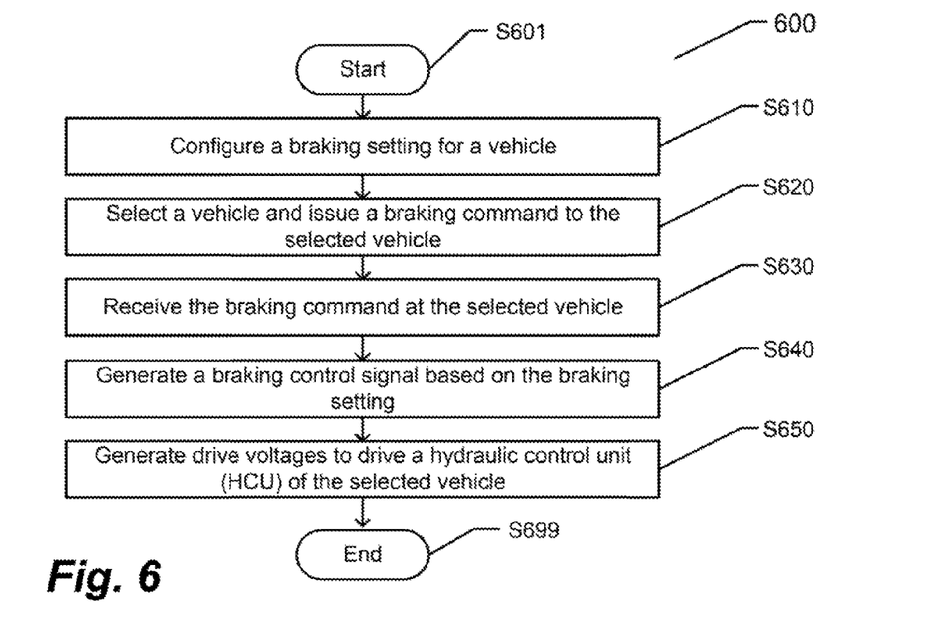
FIG. 6 shows a second process for inducing a skid in a vehicle according to an embodiment of the disclosure.

FIG. 6 shows a process 600 for inducing a skid in a vehicle according to an embodiment of the disclosure. The process 600 can be applied to examples where a mobile controller is coupled to an HCU of a brake system. The process 600 starts at S601, and proceeds to S610. The steps S610-S630 are similar to the steps S610-S630 in the process 500, and descriptions of the steps S610-S630 are omitted.

At S640, a braking control signal is generated based on the braking setting. In one example, one or more braking control signals are generated for controlling switches in a drive voltage generator.

At 650, drive voltages are generated to drive an HCU of the selected vehicle. In an example, under the control of the braking control signals generated at S640, drive voltages are generated and imposed on selected valves and pumps corresponding to wheels specified in the braking settings. In addition, the drive voltages are used to control the selected valves and pumps such that brake pressures are imposed on selected wheels during the time intervals specified in the braking setting with braking pressure levels specified in the braking setting.

Figure 7:
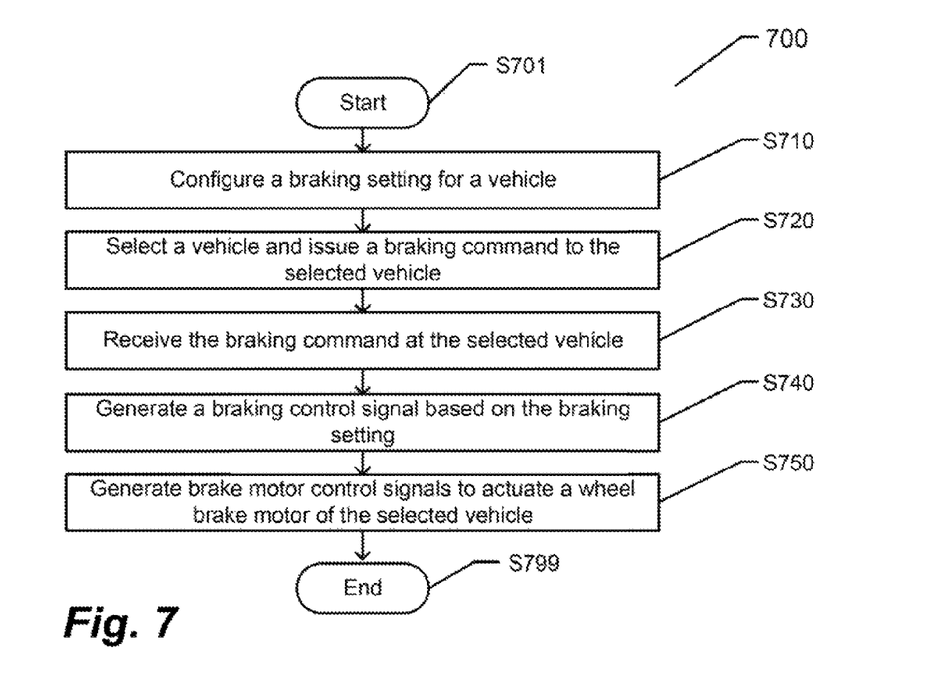
FIG. 7 shows a third process for inducing a skid in a vehicle according to an embodiment of the disclosure.

FIG. 7 shows a process 700 for inducing a skid in a vehicle according to an embodiment of the disclosure. The process 700 can be applied to examples where a mobile controller is coupled to wheel brake motors of a brake system. The process 700 starts at S701, and proceeds to S710. The steps S710-S740 are similar to the steps S610-S640 in the process 600, and descriptions of the steps S710-S740 are omitted.

At 750, a brake motor control signal is generated to a wheel brake motor of the selected vehicle. In an example, under the control of the braking control signals generated at S740, brake motor control signals are generated and imposed on wheel brake motors corresponding to wheels specified in the braking settings. In addition, the brake motor control signals are used to control the selected wheel brake motors such that brake pressures are imposed on selected wheels during the time intervals specified in the braking setting with braking pressure levels specified in the braking setting.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A remote controller for inducing a skid in a vehicle, comprising:
    processing circuitry configured to receive a selection of one mobile controller of a plurality of mobile controllers for issuance of a braking command, each of the plurality of mobile controllers associated with a distinct vehicle; and
    a transmitter configured to transmit a braking command to the selected mobile controller;
    wherein the brake setting is configurable by the remote controller.

2. The remote controller of claim 1, wherein the braking setting specifies:
    a wheel of the vehicle for braking;
    at least one time period for braking the wheel; and
    a braking pressure level corresponding to the at least one time period.

3. The remote controller of claim 1 further comprising:
    a display device that displays a user interface;
    wherein the processing circuitry is configured to control the transmitter to issue the braking command to the mobile controller.

4. A mobile controller for inducing a skid in a vehicle, comprising:
    a receiver configured to receive a braking command including a braking setting from a remote controller; and
    processing circuitry communicatively coupled to a brake system of the vehicle, and configured to control the brake system to induce a skid in the vehicle according to the brake setting, wherein the braking setting specifies:
    a wheel of the vehicle for braking;
    at least one time period for braking the wheel; and
    a braking pressure level corresponding to the at least one time period.

5. The mobile controller of claim 4, wherein the mobile controller operates the brake system of the vehicle to brake the wheel specified in the braking command during the at least one time period specified in the braking command with the braking pressure level specified in the braking command.

6. The mobile controller of claim 4, wherein the mobile controller is further configured to communicate information related to the braking setting to an electronic control unit (ECU) of the brake system of the vehicle.

7. The mobile controller of claim 4, further comprising:
    a drive voltage generator that generates a drive voltage to drive a hydraulic control unit (HCU) of the brake system of the vehicle.

8. The mobile controller of claim 4, wherein the mobile controller is further configured to generate a brake motor control signal to actuate a wheel brake motor of the brake system of the vehicle.

9. A method for inducing a skid in a vehicle, comprising:
receiving a braking command including a braking setting at a mobile controller; and
operating a brake system of a vehicle associated with the mobile controller to induce a skid in the vehicle according to the braking setting.

10. The method of claim 9, wherein the braking setting specifying:
a wheel of the vehicle associated with the selected mobile controller for inducing the skid;
a sequence of time periods for braking the wheel; and
braking pressure levels each corresponding to one of the time periods.

11. The method of claim 9, further comprising braking the wheel specified in the braking command during the time periods specified in the braking command with the braking pressure levels specified in the braking command.

12. The method of claim 9, further comprising generating a braking control signal based on the braking setting.

13. The method of claim 12, further comprising transmitting information of the braking control signal to an electrical control unit (ECU) of the brake system of the vehicle.

14. The method of claim 12, further comprising generating a drive voltage to drive a hydraulic control unit (HCU) of the brake system of the corresponding vehicle.

15. The method of claim 12, further comprising generating a brake motor control signal to actuate a wheel brake motor of the brake system of the corresponding vehicle.

16. A method for inducing a skid in a vehicle, comprising:
configuring a braking setting for a vehicle from among a plurality of available vehicles;
selecting a mobile controller from among a plurality of mobile controllers, each mobile controller associated with one vehicle from among the plurality of available vehicles; and
issuing a braking command including the braking setting to the vehicle associated with the selected mobile controller.

17. The method of claim 16, further comprising transmitting a wireless signal carrying the braking command.

18. The method of claim 16, wherein configuring the braking setting includes specifying:
a wheel of the vehicle associated with the selected mobile controller for inducing the skid;
a sequence of time periods for braking the wheel; and
braking pressure levels each corresponding to one of the time periods.

19. The method of claim 16, further comprising:
filtering a subset of mobile controllers from among the plurality of mobile controllers based on evaluation criteria associated with an operating environment; and
selecting a mobile controller from the subset of mobile controllers.

* * * * *